United States Patent
Chien et al.

(10) Patent No.: US 9,952,459 B2
(45) Date of Patent: Apr. 24, 2018

(54) ELECTRONIC DEVICE AND METHOD FOR ASSEMBLING ELECTRONIC DEVICE

(71) Applicant: HTC Corporation, Taoyuan (TW)

(72) Inventors: Shih-Po Chien, Taoyuan (TW); Chia-Huan Chang, Taoyuan (TW); Po-Chin Huang, Taoyuan (TW); Yi-Ting Liu, Taoyuan (TW); Yu-Jing Liao, Taoyuan (TW); I-Hsuan Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/794,819

(22) Filed: Jul. 9, 2015

(65) Prior Publication Data

US 2017/0010498 A1 Jan. 12, 2017

(51) Int. Cl.
*G06F 1/16* (2006.01)
*H05K 5/00* (2006.01)
*H05K 7/00* (2006.01)
*G02F 1/1333* (2006.01)

(52) U.S. Cl.
CPC ............ *G02F 1/133308* (2013.01); *G02F 2001/133311* (2013.01); *G02F 2001/133325* (2013.01); *G02F 2001/133328* (2013.01); *G02F 2202/28* (2013.01); *G06F 1/1601* (2013.01)

(58) Field of Classification Search
CPC .... G06F 1/1669; G06F 1/1601; G06F 1/1609; G09G 5/05; G02F 1/133308; G02F 2001/133311; G02F 2001/133314; G02F 2001/133317; G02F 2001/13332; G02F 2001/133322; G02F 2001/133325;
(Continued)

(56) References Cited

U.S. PATENT DOCUMENTS 6,176,029 B1 * 1/2001 Maier-Hunke ............ B42F 7/00
40/649
8,256,977 B2 * 9/2012 Takahashi .............. B41J 3/4075
400/691
(Continued)

FOREIGN PATENT DOCUMENTS

TW         200944892        11/2009

OTHER PUBLICATIONS

"Office Action of Taiwan Counterpart Application", dated Oct. 24, 2016, p. 1-p. 6.
"Office Action of Taiwan Counterpart Application," dated Sep. 5, 2017, p. 1-p. 3.

*Primary Examiner* — Anthony Haughton
(74) *Attorney, Agent, or Firm* — JCIPRNET

(57) ABSTRACT

An electronic device including a transparent cover, a transparent film, a display module, a side frame, and a base frame is provided. The transparent film is adhered to the transparent cover. The display module is adhered to the transparent film, such that the transparent film is disposed between the transparent cover and the display module. The transparent film extends to the side frame and is bonded with the side frame. The base frame is connected to the side frame. By extending the transparent film to the side frame and bonding the transparent film with the side frame, the transparent film is capable of stopping liquid, thereby archiving a waterproofing effect. A method for assembling an electronic device is also provided.

18 Claims, 2 Drawing Sheets

(58) Field of Classification Search
CPC ........ G02F 2001/133328; G02F 2001/133331;
G02F 2001/133334
USPC ....... 312/107, 112, 325, 265.2, 235.2, 223.2,
312/223.6, 137; 206/268, 273; 345/174,
345/175, 104, 418, 660, 204, 1.1;
361/747, 679.09, 679.27, 679.43, 679.08,
361/679.01, 679.55, 679.6, 679.02,
361/679.28, 679.2, 679.17, 679.06,
361/679.15, 679.26, 679.56, 679.4,
361/679.04, 679.21–679.3; 400/591, 694;
40/649, 706, 703, 768, 513, 490, 511;
349/58, 59, 60
See application file for complete search history.

(56) References Cited

U.S. PATENT DOCUMENTS

| | | | |
|---|---|---|---|
| 2015/0192963 A1* | 7/2015 | Lo | G06F 1/1658 361/679.3 |
| 2015/0351272 A1* | 12/2015 | Wildner | G02F 1/133308 361/679.21 |
| 2016/0054612 A1* | 2/2016 | Hao | G02F 1/133308 349/58 |
| 2016/0066440 A1* | 3/2016 | Choi | G06F 1/1637 361/679.3 |
| 2016/0109906 A1* | 4/2016 | Trutna | G02F 1/133308 361/747 |

* cited by examiner

ELECTRONIC DEVICE AND METHOD FOR ASSEMBLING ELECTRONIC DEVICE

FIELD OF THE APPLICATION

The application relates to an electronic device, and more particularly, to an electronic device with a display panel, and an assembly method thereof.

DESCRIPTION OF RELATED ART

Due to multi-function and miniaturization designs, smart phones, tablets, and other electronic devices have become very popular. The electronic devices of this type are often equipped with a liquid crystal display module (LCM) to display images. The electronic devices of the above described type are capable of integrating waterproofing measures in order to prevent liquid from entering and affecting the function of the LCM or other electronic components.

FIG. 1 is a partial cross-sectional view of a conventional electronic device. Referring to FIG. 1, in a conventional electronic device 10, the LCM 11 is adhered upwards to a touch panel module 14 below a glass cover 13 via an anti-spread film (ASF) 12. The anti-spread film 12 extends, thus bypassing the LCM 11 and is adhered to a base frame 15 of the electronic device 10. As a result, liquid entering the gap g between the glass cover 13 and the side cover 16 can be stopped by the anti-spread film 12 and not reach the LCM 11, thus achieving the waterproofing objective.

However, for ever-thinning electronic devices such as smart phones and tablets, the portion of the anti-spread film 12 that is between the LCM 11 and the base frame 15 and the adhesive layer 12a used to adhere to the base frame 15 inevitably increase the overall thickness of the electronic device 10. This is adverse to miniaturization of electronic devices.

SUMMARY OF THE APPLICATION

The application provides an electronic device with waterproofing capabilities while having less thickness.

The application provides an assembly method for an electronic device for manufacturing electronic devices with waterproofing capabilities.

The electronic device of the application includes an electronic device, a transparent cover, a transparent film, a display module, a side frame, and a base frame. The transparent film is adhered the transparent cover. The display module is adhered to the transparent film, such that the transparent film is located between the transparent cover and the display module. The transparent film extends to the side frame and is bonded with the side frame. The base frame is connected to the side frame.

The electronic device of this application includes a method for assembling electronic devices. A transparent cover and a display module are respectively secured to a transparent film which extends from a side frame. Next, the base frame is secured to the side frame after the transparent cover and the display module are secured to the transparent film of the side frame.

Based on the above, in this application, by extending the transparent film to the side frame and bonding the transparent film to the side frame, the transparent film is capable of stopping liquid, thereby archiving a waterproofing effect.

In order to make the aforementioned features and advantages of the application more comprehensible, embodiments accompanying figures are described in detail below.

DESCRIPTION OF THE EMBODIMENTS

Figure 1:
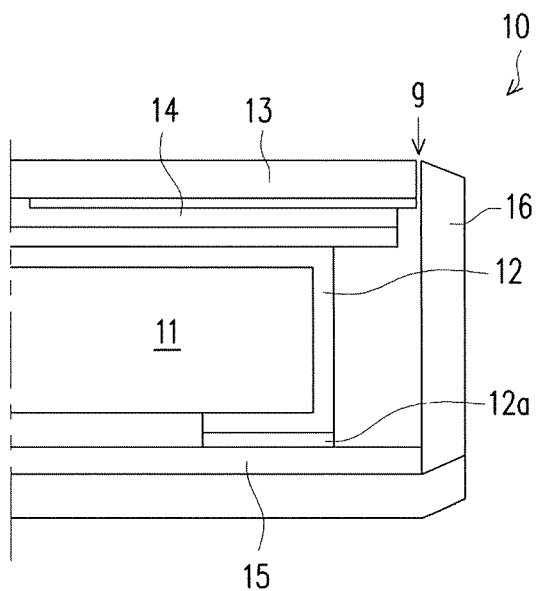
FIG. 1 is a partial cross-sectional view of a conventional electronic device.
Figure 2:
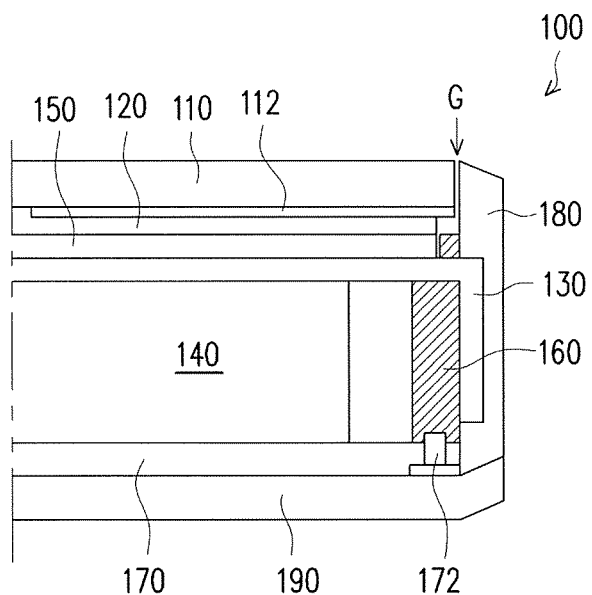
FIG. 2 is a partial cross-sectional view of a portion of an electrical assembly according to an embodiment of the application.

FIG. 2 is a partially cross-sectional view of the electrical assembly according to an embodiment of the application. Referring to FIG. 2, in the present embodiment, an electronic device 100 may be a display device, a smart phone, or a tablet. The electronic device 100 includes a transparent cover 110, a touch panel module 120, a transparent film 130, and a display module 140. The transparent cover 110 is for example a glass plate of high hardness, and there is a decorative layer 112 under the transparent cover 110 to visually block the structure below the decorative layer, thus enhancing the exterior. The touch panel module 120 is adhered to the transparent cover 110. The transparent film 130 may be an anti-spread film. The transparent film 130 is adhered to the touch panel module 120, such that the touch panel module 120 is disposed between the transparent cover 110 and the transparent film 130. In another embodiment, the transparent film 130 may include another touch panel module, that is, the transparent film 130 having already integrated another touch panel module, or directly being another touch panel module, such that the above-described touch panel module 120 may be omitted.

The display module 140 may be an LCM. The display module 140 is adhered to the transparent film 130, such that the transparent film 130 is located between the transparent cover 110 and the display module 140. The electronic device 100 may further include an optical clear adhesive layer 150, that is a layer of optical clear adhesive (OCA), wherein the optical clear adhesive layer 150 is disposed between the touch panel 120 and the transparent film 130. When the display module 140 is a touch panel module (an embedded display module, including an in-cell or on-cell type), that is, the display module 140 already has another built-in touch panel, the above-described touch panel module 120 may be omitted, such that the transparent film 130 is adhered to the transparent cover 110. If a touch panel function is not needed, the above-described touch panel module 120 is not needed such that the transparent film 130 is adhered to the transparent cover 110.

Referring to FIG. 2, the electronic device 100 further includes a side frame 160 and a base frame 170. The transparent film 130 extends to the side frame 160 and is bonded with the side frame 160. The base frame 170 is connected to the side frame 160. For example, the base frame 170 may be secured to the side frame 160 by a locking element 172 such as a screw. As a result, liquid permeating by an edge of the transparent cover 110 can be stopped by extending the transparent film 130 to the side frame 160, thus achieving a waterproofing effect. In the present embodiment, the side frame 160 covers two sides of a portion, extending to the side frame 160, of the transparent film 130. Specifically, when forming the side frame 160, by using a manufacturing technology of insert molding, the side frame 160 extends to cover the two sides of the portion, extending to the side frame 160, of the transparent film 130 to ensure that the transparent film 130 can stop liquid.

Referring to FIG. 2, the electronic device 100 further includes a side cover 180 and a base frame 160. However, due to manufacturing inaccuracy, the side frame 180 and the transparent cover 110 may form a gap G, which may allow liquid to enter, such that when the transparent film 130 extends to the side frame 160, the clean film 130 can be used to stop liquid from entering through the gap G between the transparent cover 110 and the side cover 180, thereby achieving a waterproofing effect.

Figure 3:
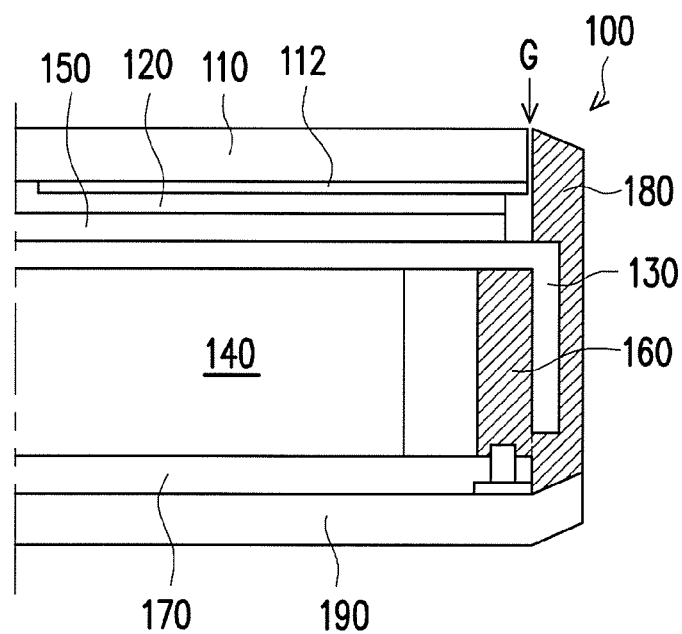
FIG. 3 is a partial cross-sectional view of the electrical assembly according to another embodiment of the application.

FIG. 3 is a partial cross-sectional view of the electrical assembly according to another embodiment of the application. Referring to FIG. 3, in comparison to the embodiment of FIG. 2, in the present embodiment, the side frame 160 and the side cover 180 are integrally formed. That is to say, the side frame 160 and the side cover 180 are formed from two portions of one component, and the one component may be for example a component manufactured by an injection molding method.

Referring to FIG. 2, the electronic device 100 may further include a bottom cover 190 which is connected to a base frame 170, and the bottom cover 190 and the side cover 180 form a portion of the exterior of the electronic device 100. In the present embodiment, the side cover 180 and the bottom cover 190 are two independently manufactured components. However, in another embodiment not shown, the side cover 180 and the bottom cover may be integrally formed.

Figure 4:
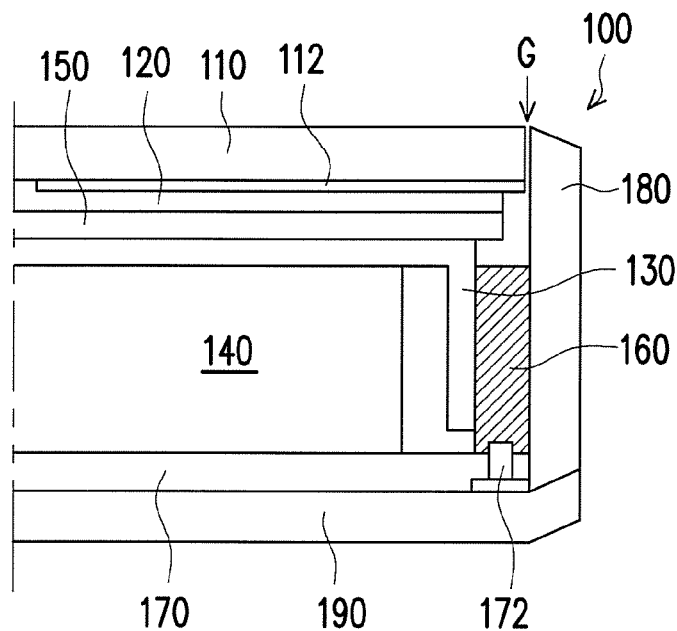
FIG. 4 is a partial cross-sectional view of the electrical assembly according to another embodiment of the application.

FIG. 4 is a partially cross-sectional view of the electrical assembly according to another embodiment of the application. Referring to FIG. 4, the transparent film 130 is adhered to the side frame 160. Specifically, a portion of the transparent film 130 extending to the side frame 160 is bonded to the side frame 160. Therefore, via the transparent film 130, liquid entering through the gap G between the transparent cover 110 and the side cover 180 can be stopped, thus ensuring liquid entering from the gap G is stopped by the transparent film 130.

In another embodiment of this application, a method for assembling the above-described electronic device 100 is provided. Referring to FIG. 2, the transparent cover 110 and the display module 140 are first respectively secured to the transparent film 130 which extends from the side frame 160. Next, the base frame 170 is secured to the side frame 160 after securing the transparent cover 110 and the display module 140 to the transparent film 130 of the side frame 160 respectively. In the present embodiment, the display panel module 120 may be disposed between the transparent cover 110 and the transparent film 130. In addition, the optical clear adhesive layer 150 may be disposed between the touch panel module 120 and the transparent film 130. Also, the side cover 180 may be connected to the side frame 160 and forms a gap G with the transparent cover 110. Furthermore, the bottom cover 190 may be connected to the base frame 170, and the bottom cover 190 and the side cover 180 form a portion of the exterior of the electronic device 100. The components utilized during the assembly method may include the variants and substitutes described above and are not limited to this paragraph.

Based on the above, in this application, by extending the transparent film to the side frame and bonding the transparent film to the side frame, the transparent film is capable of stopping liquid, thereby archiving a waterproofing effect.

Although the application has been described with reference to the above embodiments, the application is not limited to the above embodiments. It is apparent to one of ordinary skill in the art that modifications and variations to the described embodiments may be made without departing from the spirit and scope of the application. Accordingly, the scope of the application will be defined by the attached claims.

What is claimed is:

1. An electronic device, comprising:
   a transparent cover;
   a transparent film adhered to the transparent cover;
   a touch panel module disposed between the transparent cover and the transparent film;
   a display module adhered to the transparent film, such that transparent film is disposed between the transparent cover and the display module;
   a side frame, wherein the transparent film extends to the side frame and the transparent film is configured to bend corresponding to a contour of the side frame to bond with the side frame; and
   a base frame connected to the side frame.

2. The electronic device of claim 1, further comprising:
   a optical clear adhesive layer disposed between the touch panel module and the transparent film.

3. The electronic device of claim 1, wherein the transparent film is an anti-spread film.

4. The electronic device of claim 1, wherein the side frame covers two sides of a portion, extending to the side frame, of the transparent film.

5. The electronic device of claim 1, wherein a portion of the transparent film extending to the side frame is adhered to the side frame.

6. The electronic device of claim 1, wherein the base frame is locked to the side frame.

7. The electronic device of claim 1, further comprising:
   a side cover connected to the side frame and formed a gap with the transparent cover.

8. The electronic device of claim 7, wherein the side frame and the side cover are formed by two portions of a single component respectively.

9. The electronic device of claim 7, further comprising:
   a bottom cover connected to the base frame, and the bottom cover and the side cover forming a portion of the exterior of the electronics device.

10. A method for assembling an electronic device, comprising:
    securing a transparent cover, a touch panel module, and a display module respectively to a transparent film which extends from a side frame and the transparent film is configured to bend corresponding to a contour of the side frame to bond with the side frame; and
    securing a base frame to the side frame after securing the transparent cover and the display module to the transparent film of the side frame.

11. The method of claim 10, further comprising:
    bonding the touch panel module and the transparent film via an optical clear adhesive layer.

12. The method of claim 10, wherein the transparent film is an anti-spread film.

13. The method of claim 10, wherein the side frame covers two sides of a portion, extending to the side frame, of the transparent film.

14. The method of claim 10, wherein a portion of the transparent film extending to the side frame is adhered to the side frame.

15. The method of claim 10, wherein the base frame is secured to the side frame.

16. The method of claim 10, further comprising:
    connecting a side cover to the side frame, and the side cover and the transparent cover forming a gap.

17. The method of claim 16, wherein the side frame and the side cover are respectively formed by two portions of a single component.

18. The method of claim 16, further comprising:
    connecting a bottom cover to the base frame, and the bottom cover and the side cover forming a portion of an exterior of the electronics device.

* * * * *